Feb. 13, 1951          R. E. GRUBER          2,541,581

DRINKING GLASS

Filed Oct. 4, 1948

INVENTOR.
Ralph E. Gruber

BY

UNITED STATES PATENT OFFICE 2,541,581

DRINKING GLASS

Ralph Emil Gruber, San Francisco, Calif.

Application October 4, 1948, Serial No. 52,768

1 Claim. (Cl. 65—13)

My invention relates to glasses or vessels usually used by persons in the consumption of various liquids, such as water or liquor and is concerned with spillage and overflow which sometimes occur. While in some instances and with some liquids, it is not of much consequence if the liquid spills or overflows, still there are many occasions when overflow or spillage is damaging or certainly inconvenient and undesirable.

It is therefore an object of my invention to provide a drinking glass provided with means for preventing deleterious results from overflow or spillage of liquid from the glass.

Another object of my invention is in general to improve drinking glasses.

An additional object of the invention is to provide a drinking glass with an absorbent means which can be removed, cleaned and replaced readily.

A further object of the invention is to provide a drinking glass readily adapted to receive an absorbent material or to be used without it.

A further object of the invention is to provide a drinking glass, the design of which is such that overflow or spilled liquids are readily caught by an absorbent material.

Other objects of the invention together with the foregoing are attained in the embodiment of the invention described in the accompanying description and illustrated in the accompanying drawings in which Figure 1 is a side elevation of a drinking glass constructed in accordance with my invention.

Figure 1:
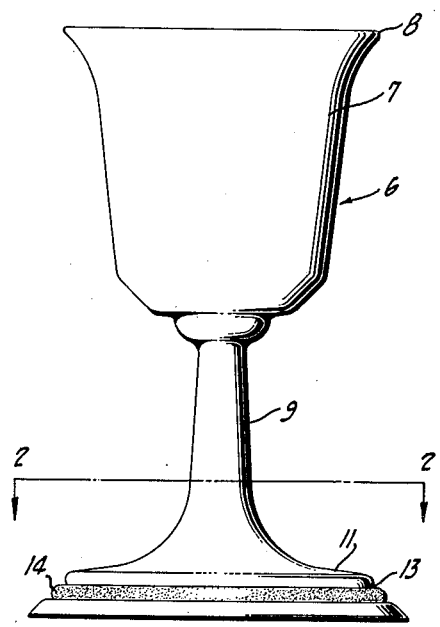
Figure 3:
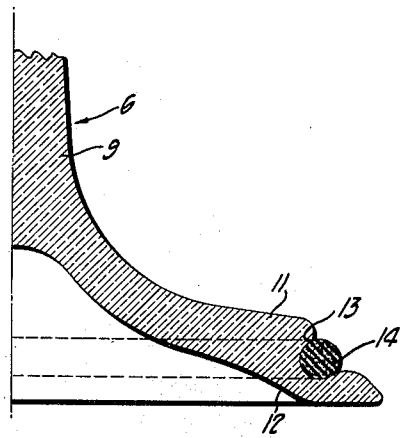
Figure 3 is a cross-section on a vertical, diametral plane to an enlarged scale showing the drinking glass of my invention with an absorbent ring in position thereon.
Figure 2:
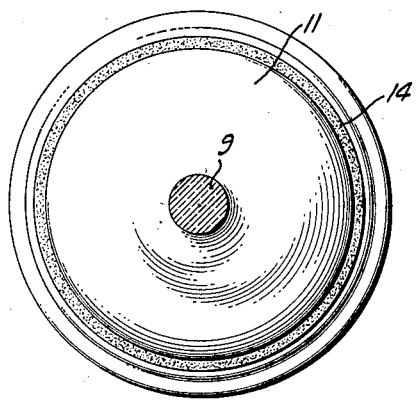
Figure 2 is a cross-section, the plane of which is indicated by the line 2—2 of Figure 1.

In its preferred form, the drinking glass of my invention comprises generally a vessel having a liquid containing portion terminating in a circular rim over which liquid occasionally, either by accident or otherwise, travels. Included in the vessel is a base having formed in it a peripheral groove usually circular in contour and of substantially the same diameter as the rim diameter. Removably lodged in the groove is a ring of a resilient, absorbent material. Because of its resiliency, the ring is readily removed and replaced over the top or over the base of the vessel and holds itself in position when within the groove. It normally is lodged entirely within the confines of the groove with a portion exposed in the path of liquid traveling from the rim. Being absorbent, it absorbs any reasonable amount of such liquid.

While the drinking glass of my invention is well adapted for use in a wide variety of environmental conditions and while its particular configuration and size vary as do glass sizes in general, it has been successfully embodied as illustrated herein in the form of a stemmed drinking goblet.

In this particular form, there is provided a vessel 6 generally of vitreous material having a liquid containing portion or chamber 7 generally of circular cylindrical cross-section and of an artistically contoured envelope terminating at its upper portion in a circular rim 8 of a predetermined or established diameter. Either by overfilling or upon or after use some of the liquid within the chamber 7 occasionally travels over the rim 8. The contour of the rim is such that some amounts of liquid drop or descend substantially vertically from the rim out of contact with the material of the drinking vessel and other amounts of liquid adhere to the material of the vessel and travel along its contour.

Joining the chamber 7 is a central stem 9 of the usual kind adapted to be grasped by the user. The stem gradually merges with a supporting base 11 integral with the remainder of the vessel and preferably having a slightly concave lower face 12. The rim of the base 11 is in the present instance generally a flat or truncated cone in configuration and includes a peripheral groove 13 formed in the material of the vessel. The groove is preferably circular in configuration in cross-section on an axial plane and in cross-section on a transverse plane. The transverse cross-sectional diameter of the groove 13 is substantially the same as the diameter of the rim 8 so that the groove lies substantially vertically below the rim 8. The groove 13 is relatively deep so that its axially circular cross-section is within or tangent to the elements of the cone forming the envelope or rim surface of the base.

Adapted removably to be lodged within the groove 13 is a ring 14 of a suitable elastic or resilient and absorbent material. I have found by experience that a relatively fine grained sponge rubber is a suitable material for the ring since it possesses the necessary resilience, is not deleteriously affected by the liquids which are normally encountered in drinking glasses and has a large capacity for absorbing and generally retaining liquids. It can be cleaned and reused repeatedly but is sufficiently inexpensive so that under some circumstances a single use and replacement by another similar ring is not economically prohibitive.

The elastic or resilient ring 14 is of circular cross-section in two planes substantially the same as the groove 13 and is of resilience sufficient so that it can be applied from either end, that is either first over the rim 8 and then into the groove or first over the bottom and then into the groove. In either case, the ring is lodged entirely within the groove, not projecting past the envelope of the cone so that it is not likely to be contacted by the hands of a user. At the same time, the ring can readily be dislodged by the user's fingers or by a prying tool when it is to be changed.

In normal use, while the ring 14 does not project and is not likely to be contacted by user's hand, it is still available to intercept and absorb liquid which has left the vessel over the rim 8 in either of two ways. The ring 14 is substantially immediately below the rim 8 so that any drops of liquid which fall are most likely to fall directly upon the exposed surface of the ring. Liquid which flows over and in contact with the surface of the vessel eventually travels down the stem and finally is absorbed by the ring 14 before it reaches a table or other supporting surface. The structure provides an absorbent means effective for its purpose, yet which is not unsightly and does not substantially interfere with the construction of the remaining part of the vessel being confined solely to the base portion thereof. The vessel itself can be utilized without the ring 14 if essential, and its appearance is not so unusual as to attract undue attention to the missing part. The absorbency of the ring is such that it can retain a large amount of spilled liquid for a protracted period without in any way interfering with the continued use of the vessel. In general, therefore, I have provided an improved drinking glass having means for absorbing spilled or dropped liquid and preventing it from falling upon a subjacent supporting surface.

I claim:

A drinking glass comprising a vessel having at its top an outwardly projecting circular rim, there being an outwardly projecting circular base at the bottom of said vessel, said base having a circular, upwardly and outwardly opening peripheral groove disposed substantially beneath said rim, said groove being integrally formed in said base and being approximately semi-circular in cross section, and a sponge rubber ring of substantially circular cross section lodged entirely within said groove but having a portion exposed to absorb liquid dropping from said rim and running down the surface of said glass.

RALPH EMIL GRUBER.

REFERENCES CITED

The following references are of record in the file of this patent:

UNITED STATES PATENTS

| Number | Name | Date |
| --- | --- | --- |
| 134,302 | Miller | Dec. 24, 1872 |
| 140,793 | Ripley | July 15, 1873 |
| 150,227 | Cox | Apr. 28, 1874 |
| 571,088 | Hamilton | Nov. 10, 1896 |
| 608,649 | Christiansen | Aug. 9, 1898 |
| 862,953 | Westlake | Aug. 13, 1907 |
| 1,449,335 | Lotham | Mar. 20, 1923 |
| 1,759,176 | Voorhees | May 20, 1930 |

FOREIGN PATENTS

| Number | Country | Date |
| --- | --- | --- |
| 14,081 | Great Britain | Oct. 22, 1892 |